(12) United States Patent
Huber

(10) Patent No.: US 9,382,004 B2
(45) Date of Patent: Jul. 5, 2016

(54) CARGO LOADING SYSTEM FOR LOADING AND UNLOADING A CARGO ITEM, METHOD FOR CREATING AND/OR UPDATING A LOADING PLAN

(71) Applicant: Telair International GmbH, Miesbach (DE)

(72) Inventor: Thomas Huber, Schliersee (DE)

(73) Assignee: Telair International GmbH (DE)

( * ) Notice: Subject to any disclaimer, the term of this patent is extended or adjusted under 35 U.S.C. 154(b) by 0 days.

(21) Appl. No.: 14/686,085

(22) Filed: Apr. 14, 2015

(65) Prior Publication Data

US 2015/0298808 A1 Oct. 22, 2015

(30) Foreign Application Priority Data

Apr. 22, 2014 (DE) .......................... 10 2014 105 657

(51) Int. Cl.
*G01C 22/00* (2006.01)
*B64D 9/00* (2006.01)
*B64C 1/20* (2006.01)
(Continued)

(52) U.S. Cl.
CPC ... *B64D 9/00* (2013.01); *B64C 1/20* (2013.01); *G01C 21/00* (2013.01); *G06K 7/10366* (2013.01); *B64C 1/22* (2013.01); *B64D 2009/006* (2013.01); *G06F 7/00* (2013.01); *G06Q 10/08* (2013.01); *G08B 1/08* (2013.01); *G08B 13/14* (2013.01); *H04W 4/00* (2013.01); *H04W 88/16* (2013.01)

(58) Field of Classification Search
CPC .............. B64D 1/00; B64D 1/10; B64D 9/00; B64D 2009/006; B64F 1/36; B64F 1/32; G06K 7/10366; G06F 7/00; H04W 88/16; H04W 4/00; G08B 13/13; G08B 1/08; B64C 1/22; B64C 1/20; G06Q 10/08; G01C 21/00
See application file for complete search history.

(56) References Cited

U.S. PATENT DOCUMENTS

| | | | |
|---|---|---|---|
| 6,616,103 B2 * | 9/2003 | Marrero ................... | B64D 1/10 220/1.6 |
| 2010/0100225 A1 | 4/2010 | Reed et al. | |
| 2013/0297065 A1 * | 11/2013 | Huber ...................... | B64C 1/22 700/230 |

FOREIGN PATENT DOCUMENTS

| | | |
|---|---|---|
| DE | 19807229 A1 | 9/1999 |
| DE | 102005026898 A1 | 1/2006 |

(Continued)

OTHER PUBLICATIONS

European Search Report in EPO application 15164215.4 dated Aug. 20, 2015.

*Primary Examiner* — Behrang Badii
(74) *Attorney, Agent, or Firm* — Barnes & Thornburg LLP

(57) ABSTRACT

A cargo loading system comprising at least one cargo reading device mounted in the entrance area of an aircraft, in particular an RFID reading device, for detecting at least one identifier of a cargo item, a plurality of freight conveying devices each having at least one roller for conveying the cargo item along a conveying route into an end position, and a control system which receives signals from sensors in order to detect a movement of the cargo item along the conveying route and which is communicatively connected to the cargo reading device. The control system is designed to detect the end position of the cargo item on the cargo deck based on the signals and to store data which indicate the end position in conjunction with the detected identifier of the cargo deck.

15 Claims, 5 Drawing Sheets

Figure 1:
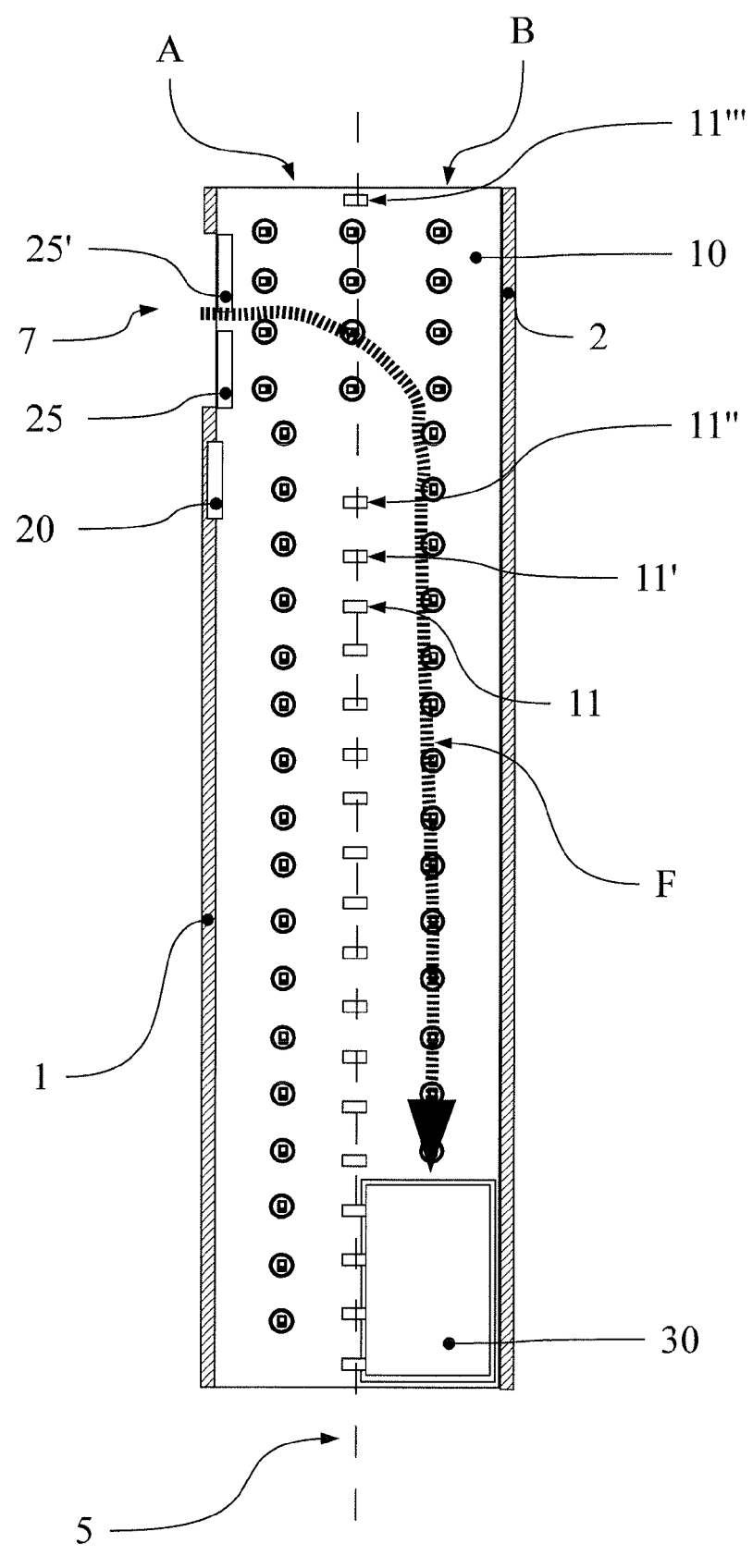

(51) Int. Cl.
*G01C 21/00* (2006.01)
*G06K 7/10* (2006.01)
*G06F 7/00* (2006.01)
*H04W 88/16* (2009.01)
*G08B 13/14* (2006.01)
*G08B 1/08* (2006.01)
*H04W 4/00* (2009.01)
*B64C 1/22* (2006.01)
*G06Q 10/08* (2012.01)

(56) References Cited

FOREIGN PATENT DOCUMENTS

| | | |
|---|---|---|
| DE | 102008057076 A1 | 2/2010 |
| DE | 102011000743 A1 | 4/2012 |
| DE | 102011000819 A1 | 8/2012 |
| DE | 102011000820 | 8/2012 |
| EP | 2444320 A2 | 4/2012 |
| EP | 2532582 A2 | 12/2012 |

* cited by examiner

CARGO LOADING SYSTEM FOR LOADING AND UNLOADING A CARGO ITEM, METHOD FOR CREATING AND/OR UPDATING A LOADING PLAN

BACKGROUND

The invention relates to a cargo loading system for loading and unloading a cargo deck and a method for creating and/or updating a loading plan.

For transporting air cargo, the cargo items to be transported, in particular containers or pallets, which are preferably fabricated in accordance with specific standards, are fixed inside the cargo hold by means of locking elements on the cargo deck of said cargo hold. Such locking elements frequently form cargo loading paths between which the standardised cargo items can be positioned. Cargo loading systems which assist the ground staff during loading and unloading are used to position the cargo items in the positions intended for them. The cargo loading systems are intended to speed up the process and preferably be very easy to operate as the ground staff have frequently not been given any instruction with regard to a specific cargo loading system. In addition, both loading and unloading is carried out under severe time pressure which can easily lead to incorrect operation.

There is a growing trend for operating companies to want to know where a particular cargo item is located at any one time. On one hand, this information is requested by customers and, on the other hand, such information enables better evaluation of the processes.

Furthermore, it is frequently the case that cargo items are unloaded at the wrong airport or are loaded onto the wrong aircraft.

A poor loading strategy can significantly disrupt operations even when a cargo item is loaded onto the right aircraft. For example, if an aircraft lands at several airports, it is desirable for the cargo items that are to be unloaded at the first destination airport to be located in appropriate positions close to the cargo hatches. Completely unloading the cargo deck simply for the sake of a single wrongly positioned cargo item costs both time and money. Hence there are loading plans which indicate the desired position of a cargo item on the cargo deck. Often, however, these loading plans are not complied with as it is not possible to predict various parameters (weight, number of cases per cargo item, etc.) accurately enough in advance. There are also deviations from the cargo loading plans created in advance because the current situation requires it (for example, a projecting length, a faulty section of the cargo deck, etc.). In these circumstances, it is desirable to be able to carry out a quick update of a loading plan. An appropriate process should preferably be carried out automatically.

Based upon this prior art, it is an object of the present invention to provide an improved cargo loading system which guarantees efficient loading and unloading of a cargo deck. In particular, it should be possible to determine the current position of a cargo item on the aircraft deck of the cargo loading system using the simplest components possible.

The said object is achieved by a cargo loading system according to claim 1.

In particular, the object is achieved by a cargo loading system for loading and unloading a cargo deck, in particular an aircraft deck, wherein the cargo loading system comprises:
- at least one cargo reading device mounted in the entrance area of the aircraft, in particular an RFID reading device, for detecting at least one identifier of a cargo item;
- a plurality of freight conveying devices each having at least one roller for conveying the cargo item along a conveying route into an end position,
- a control system which receives signals from sensors in order to detect a movement of the cargo item along the conveying route and which is communicatively connected to the cargo reading device,
wherein the control system is designed to detect the end position of the cargo item on the cargo deck based on the signals and to store data which indicate said end position in conjunction with the detected identifier of the cargo item.

A basic idea of the teaching according to the invention consists, therefore, of identifying a particular cargo item at a central point, for example near the cargo hatch or the entrance area, and then of tracking the conveying route of the cargo item on the aircraft deck. The conveying route makes it possible to assign an end position to the identified cargo item. According to the invention, this end position should be stored in conjunction with the detected identifier.

A conveying route may be a continuous line, from a starting point up to an end point, of the end position. Due to the mechanical conditions (for example, a cargo deck only has two conveyor tracks), the level of detail of a conveying route can also be selected relatively roughly. Thus the conveying route may indicate the path of the cargo item in sections, for example only at specific branching points.

Moreover, it is not necessary to store the entire conveying route if one can indicate at any time where a specific cargo item is located. In this respect, various transit stops can be taken into account, wherein an assignment between identifier and position is possible at any time. In this respect, a conveying route may also indicate only the path from one transit stop to the next.

The design concept according to the invention makes it possible, without providing a plurality of cargo reading devices which are scattered over the entire aircraft deck, to determine the position of a specific cargo item relatively accurately. The corresponding cargo deck can thus be designed relatively easily. It is possible to dispense with expensive reading devices which can interfere with each other as their number increases.

The control system may be communicatively connected, in particular via a communication bus, to the plurality of freight conveying devices in order to detect activation of at least some of the freight conveying devices and/or to bring this about. Likewise, the communication bus may also connect individual sensors to the control system.

The control system may be implemented centrally or locally.

In one embodiment, the cargo loading system according to the invention exclusively detects the activation states of the freight conveying devices. By tracking these activation states over time, it is possible to determine the conveying route which a specific cargo item takes. Additionally or alternatively, the control system may specify the activation of the freight conveying devices such that the conveying route is actively determined and not merely passively detected.

The accuracy of determining the conveying route is improved if the dimensions of the cargo item are known. The control system may be designed to detect a dimension of a base area of the cargo item and to process it for determining the end position and/or conveying route of the cargo item. In one embodiment, the dimensions are measured in the entrance area of the aircraft by an appropriate sensor system, for example a light barrier. In an alternative embodiment, the detected identifier makes it possible to determine the dimensions of the base area. The cargo loading system may have appropriate tables. Alternatively, a portion of the identifier may specify the base area and/or the type of cargo item. According to the invention it would also be possible to enter the dimensions of the base area manually.

The sensors may comprise light sensors which are arranged and formed on the cargo deck in such a manner that they detect at least the presence of a cargo item. Light sensors on the cargo deck make it relatively easy to detect overlapping of the relevant light sensor by a cargo item. In this respect, it is relatively easy to determine the position of the cargo item at a specific point in time with such sensors.

In one embodiment, the conveying route of a cargo item is determined taking into account sensor signals and signals which indicate the activation state of the freight conveying devices. In this way, a very precise conveying route can be calculated.

At least one subset of the sensors may be arranged in a grid spanning the width of the cargo deck, preferably in the loading and unloading area of said cargo deck. As cargo items are normally rotated in the loading and unloading area and aligned corresponding to the cargo loading path provided, it is advantageous to have a relatively high sensor density in the region of the loading and unloading area. Furthermore, the individual cargo loading paths should be provided with appropriate sensors at least in sections. In a preferred embodiment, sensors for detecting the presence of the cargo item are arranged at least every two meters in the longitudinal direction of a cargo loading path. These sensors are communicatively connected to the control system in order to detect the conveying route of each cargo item.

At least one subset of the freight conveying devices may comprise at least one sensor in each case, preferably two or four sensors, for detecting the cargo item. In one embodiment, these sensors are arranged on the relevant freight conveying device. The sensors preferably surround a roller. Corresponding arrangements are known and are used, inter alia, to raise the roller of a specific freight conveying device at the right time without it being damaged. In state-of-the-art cargo loading systems, alignment of the roller can also take place in advance based on the sensor signals received.

At least one subset of the freight conveying devices should be arranged according to the invention in a grid. This is particularly advantageous in the loading and unloading area of the cargo deck as cargo items frequently pass by here and change their conveying direction as required.

The control system can be designed to store at least some of the signals as a signal set, in particular in conjunction with a sequence and/or a time indication. Basically, it is sufficient to store the identifier of a cargo item in conjunction with the end position. In a preferred embodiment, details are also stored which make it possible to reconstruct the conveying route from the time at which the identifier of the cargo item was detected through to the end position. Corresponding data can be stored in the form of a signal set. In one embodiment, the plurality of detected signals is stored in a sequence so that there is an order which makes it possible to reconstruct the chronological sequence of receiving the signals. Alternatively or additionally, specific time indications can be stored in conjunction with the signals or signal sets. This information is preferably stored long-term so that it is still available even at a later stage.

The control system may be designed to develop a control strategy, taking into account an entered loading position, and to control a plurality of the freight conveying devices according to said control strategy. As already explained, the control system need not be designed merely to detect a control strategy specified by a person such that it is ultimately possible to determine the end position. Cargo loading systems according to the invention may at least automate the loading process such that the loading staff merely have to specify an end position, wherein the control system determines a control strategy such that the cargo items approach this end position. According to the invention, the control system then monitors the loading process in such a precise manner that the conveying route of the cargo item is detected and it can be ascertained with certainty that a specific end position has been approached. In particular, subsequent manual corrections and/or later transshipment operations are detected, wherein the system knows the exact position of a specific cargo item at any time.

The control system may also be designed to monitor the conveying route of a transshipment operation of a cargo item, to determine a new end position of the cargo item taking into account the conveying route, and to store the new end position in conjunction with a detected identifier of the cargo deck. The control system according to the invention thus ensures that the end position assigned to a specific cargo item or to a specific identifier is always up to date.

In addition, the object referred to at the outset is achieved by an aircraft comprising the cargo loading system already described. Similar advantages emerge, such as have already been described in connection with the cargo loading system.

In addition, the object according to the invention is achieved by means of a method for creating and/or updating a loading plan, comprising the following steps:

Detecting an identifier of a cargo item in at least one entry or entrance area of a cargo deck;
Receiving a plurality of signals from sensors which are distributed over at least one section of a cargo deck;
Determining a conveying route based on the signals;
Calculating an end position of the cargo item, taking into account the conveying route;
Storing of data which indicate the end position, in conjunction with the detected identifier.

In one embodiment, the method is implemented by the cargo loading system already described in one of the configurations described.

Thus, on the method side, a loading plan is created and/or updated, wherein in turn an identifier is detected in a central region, for example in the entrance area of the cargo deck, and then an end position is determined based on tracking of a conveying route. The data pair (identifier and end position) can then be used to update the loading plan, which may already be present, and/or to supplement it. No manual interaction is necessary. Finally, a specified loading plan can also be compared with a loading plan created dynamically on the basis of the method described. Deviations can be detected and displayed for a user. In this way, errors during loading and/or unloading of the cargo deck can be identified and corrected at an early stage.

Detection of the identifier may comprise reading of a memory mounted on the cargo item, in particular of an RFID chip. Identification of cargo items using RFID chips is relatively easy and inexpensive.

Moreover, it is possible when using this technology to dispense with the provision of energy sources on the cargo items such that there is no need for maintenance on the cargo item.

At least some of the signals from the sensors may be stored in a time sequence and/or in conjunction with time indications.

At least some of the signals may indicate an activation of an actuator, in particular of a freight conveying device, at a specific time.

The said object is additionally achieved by means of a computer-readable medium having instructions for performing the method already described, in particular in a specific embodiment, if the instructions are executed on a central processing unit.

Further advantageous developments emerge from the dependent claims.

BRIEF DESCRIPTION OF THE DRAWING FIGURES

The invention is described below with reference to several embodiment examples which will be explained in more detail with reference to drawings.

Figure 2:
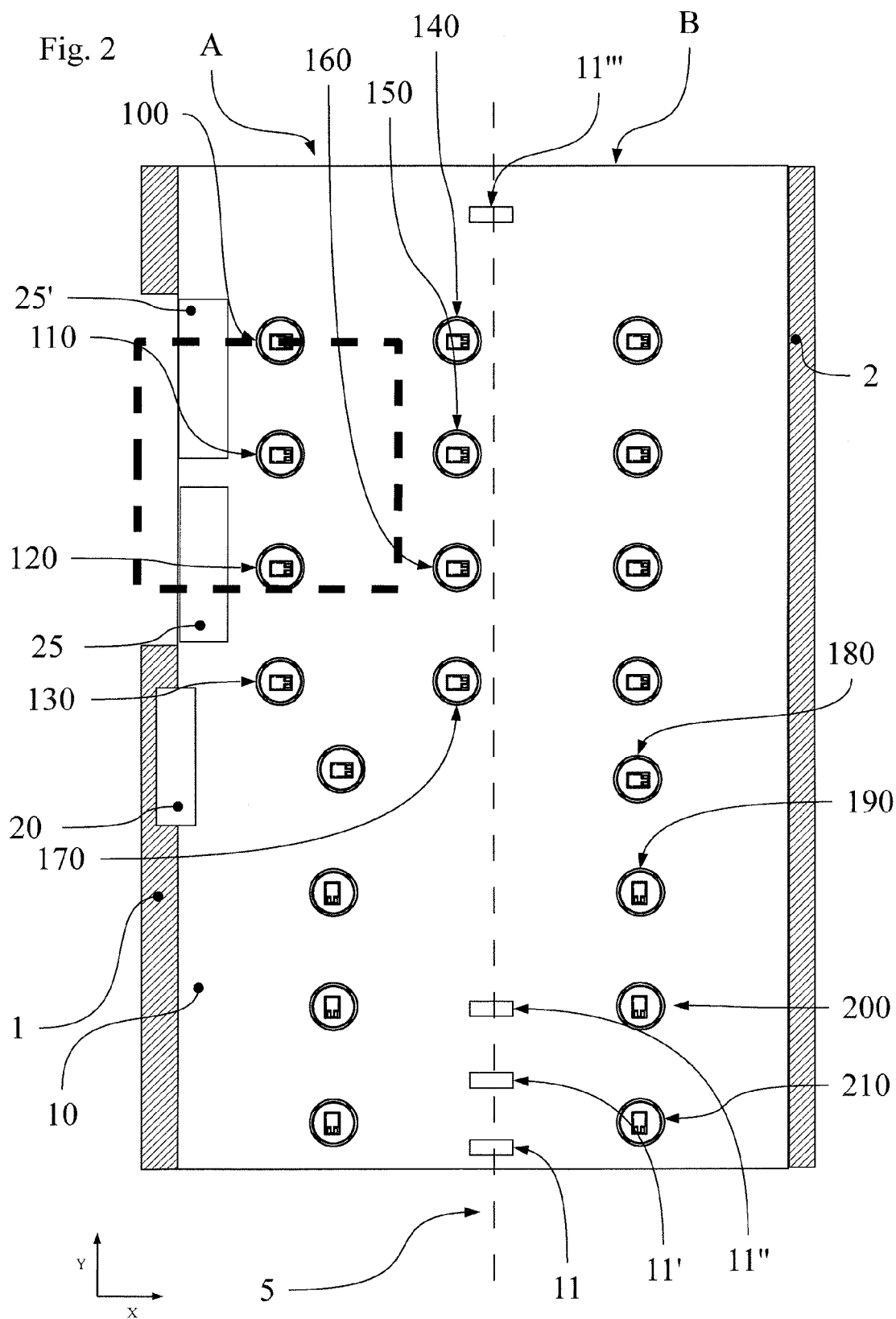
Figure 3:
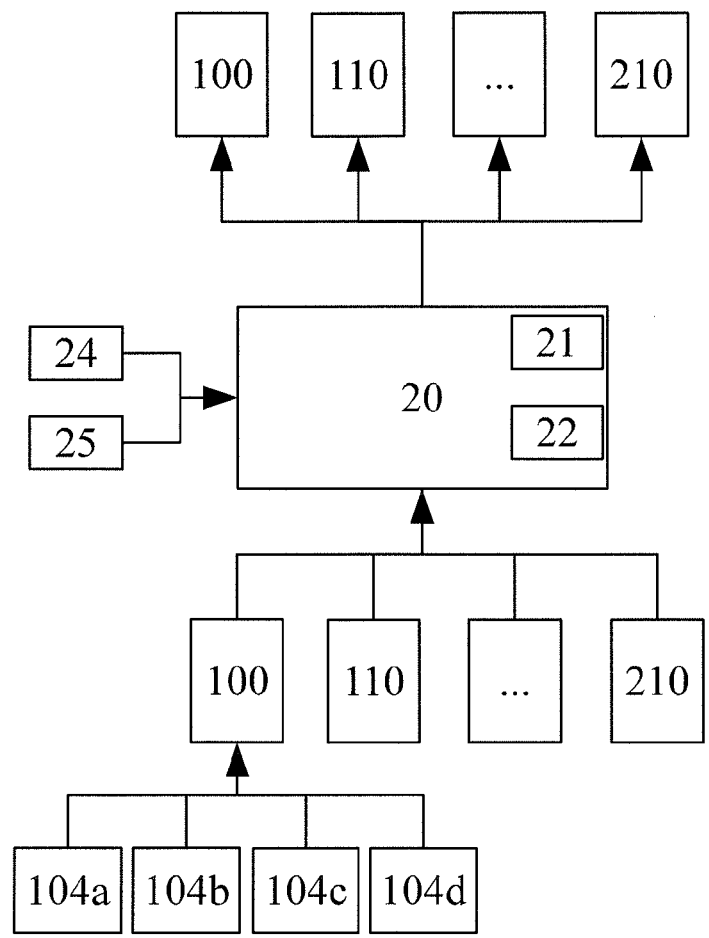
Figure 4:
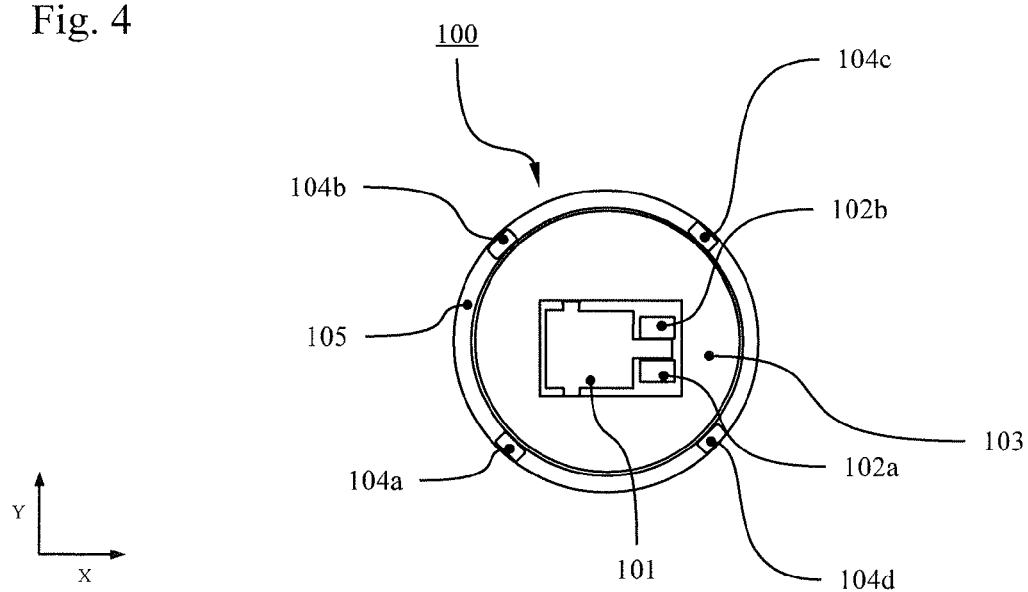
Figure 5:
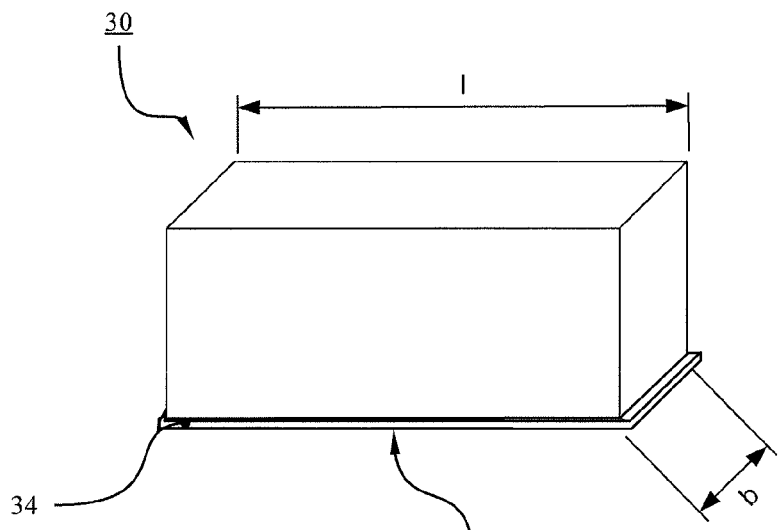
Figure 6:
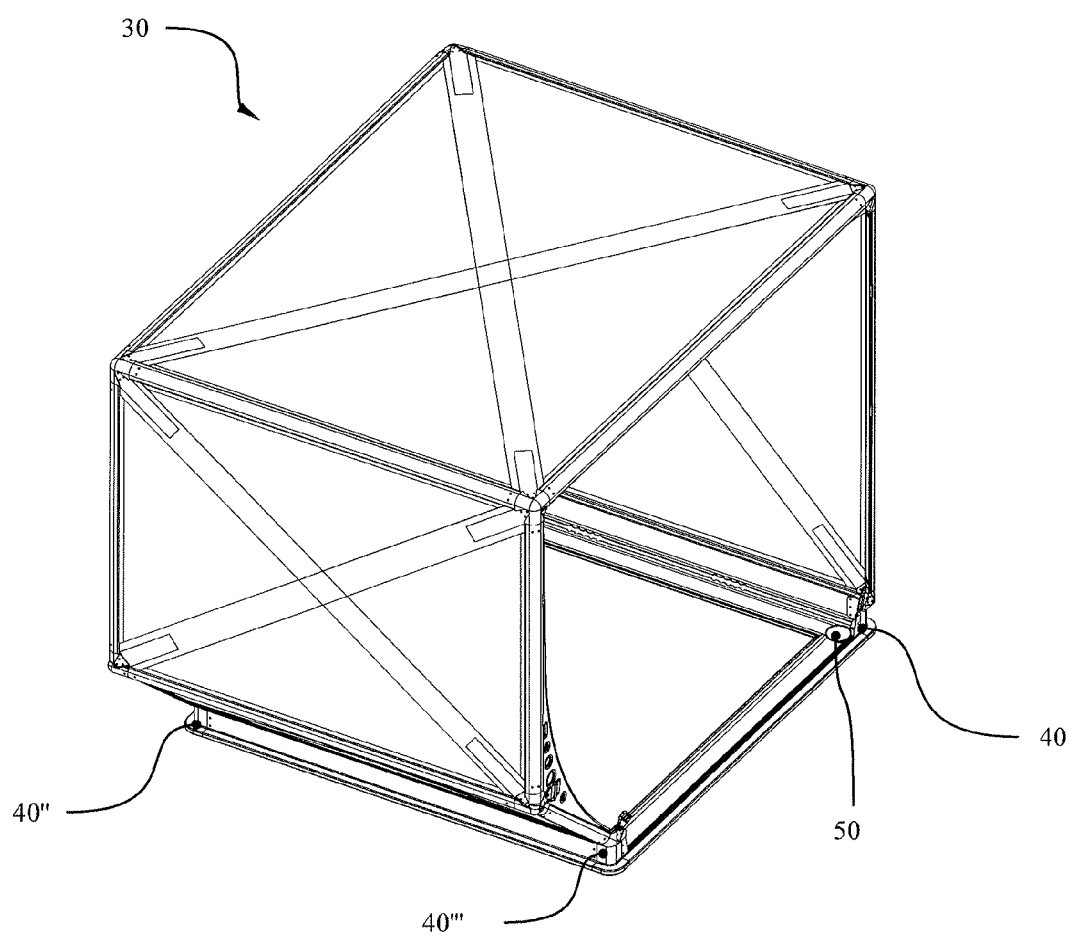
Figure 7:
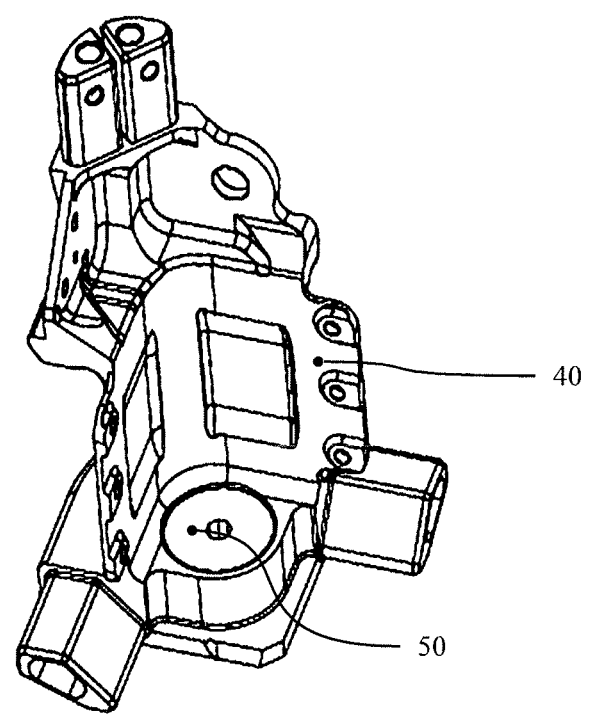

The figures show:

FIG. 1 a plan view of a cargo deck of an aircraft, wherein the conveying route of a cargo item is illustrated schematically;

FIG. 2 a detailed view of the cargo deck from FIG. 1;

FIG. 3 a schematic diagram of the control system according to the invention with actuators and sensors;

FIG. 4 a detailed view of the freight conveying devices of the cargo deck according to FIG. 1;

FIG. 5 a schematic diagram of the cargo item from FIG. 1;

FIG. 6 an alternative embodiment of a cargo item;

FIG. 7 a corner of a cargo item according to FIG. 6 with transponder holding device for an RFID tag.

DETAILED DESCRIPTION

In the following description, the same reference numerals are used for identical parts and parts acting in an identical manner.

FIG. 1 shows a plan view of a cargo deck 10 with a cargo loading system according to the invention. The cargo deck 10 is essentially rectangular and extends in the X-Y plane (the Y direction corresponds to the aircraft's longitudinal direction and the X direction to the transverse direction) of the aircraft and is limited by a left side wall 1 and a right side wall 2. The left side wall is interrupted in sections to form a door opening 7. A cargo container 30, as shown schematically in FIG. 5. is introduced into the cargo hold through the door opening 7. An essential component of the cargo loading system is a control system 20 which is communicatively connected to the individual sensors and actuators of the cargo deck 10.

The control system 20 is designed to detect an identifier of the cargo container 30 by means of RFID sensor devices 25, 25' inserted in the floor in the entrance area close to the door opening 7. After this, the control system 20 tracks the path which the cargo container 30 takes up to its end position (cf. position of the cargo container 30 in FIG. 1). This path (cf. dashed arrow of FIG. 1) provides information about a conveying route F along which the cargo container 30 will be guided. According to the invention, the control system 20 uses the conveying route F in order to determine the end position of the cargo container 30 and to store this in conjunction with the detected identifier of the cargo container. This identifier is preferably stored in an RFID tag 34 which is fastened to the cargo container 30 (cf. FIG. 5).

The cargo deck 10 of FIG. 1 is essentially symmetrical to a central plane 5. A plurality of central latches 11, 11', 11", 11''' are arranged along this central plane 5. These central latches 11, 11', 11", 11''' define a first cargo loading path A (left) and a second cargo loading path B (right). Cargo items, in particular the cargo container 30, can be fixed within these cargo loading paths and take up their end position. The cargo loading paths A, B are equipped with a plurality of freight conveying devices, for example the freight conveying devices 200, 210. The arrangement of the freight conveying devices 200, 210 in the cargo loading paths A, B is also essentially symmetrical to the central plane 5. The density of the freight conveying devices 100, 110, 120, 130, 140, 150, 160, 170, 180, 190 is particularly high in the loading and unloading area of the cargo deck 10 close to the door opening 7 such that the cargo container 30 can be rotated in this area. In addition, the cargo container 30 is aligned in this area in such a manner that it can be moved into one of the cargo conveying paths A or B. The control system 20 according to the invention tracks this alignment process accurately such that the conveying route F can be determined.

The freight conveying devices 100, 110, 120, . . . 210 are designed to transport the cargo container 30 entering and to push it into a specified position within the cargo loading path A, B. The freight conveying devices 100, 110, 120, . . . , 210 may, for example, be such as those defined in DE 198 07 229 A1. Theoretically, the same freight conveying devices 100, 110, 120, . . . , 210 can be used on the entire cargo deck 10. Preferably, however, the freight conveying devices 200, 210 from the cargo conveying paths A, B have a smaller range of functions (e.g. no rotating function).

FIG. 4 shows, by way of example, a detailed view of the freight conveying device 100. The freight conveying device 100 has an annular frame 105 and a circular rotating plate 103 arranged in said frame 105 (it is possible to dispense with such a rotating plate with the freight conveying devices 200, 210 of cargo conveying paths A, B). Rotating plate 103 is rotatably supported within the frame 105 in such a manner that it can be rotated about a rotational axis in the X-Y plane. The freight conveying device 100 has corresponding actuators and sensors such that the rotating plate 103 can be aligned arbitrarily within the frame 105. The sensors provide information about the alignment of the rotating plate 103 within the frame 105. According to the invention, the control system 20 queries these sensors in order to determined the conveying route F.

The rotating plate 103 accommodates a roller drive unit 101 which actuates the drive rollers 102a, 102b. The drive rollers 102a, 102b are designed to propel the cargo container 30 in a direction transverse to the rotary axis of said drive rollers 102a, 102b essentially within the X-Y plane. The freight conveying device 100 additionally comprises four sensor devices 104a, 104b, 104c, 104d which are arranged on the frame 105. The alignment of the rotating plate 103 does not affect the position of the sensor devices 104a, 104b, 104c, 104d. The sensor devices 104a, 104b, 104c, 104d are preferably each arranged on opposing sides of the frame 105 and can each detect overlap by a cargo item separately from each other. According to the invention, the sensor devices 104a, 104b, 104c, 104d may comprise a photodetector and a light emitting diode in order to guarantee the described function (overlap detection).

The control system 20 according to the invention also queries the sensor devices 104a, 104b, 104c, 104d of the freight conveying devices 100, 110, . . . , 190 in order to determine the conveying route F. The freight conveying devices 200, 210 of the cargo conveying paths A, B are also equipped with corresponding sensor devices 104a, 104b, 104c, 104d which are communicatively connected to the control system 20. In this respect, detection of the cargo container 30 is also possible within the cargo conveying paths A, B.

Due to the arrangement of the individual freight conveying devices 100, 110, 120, . . . , 190 already described with reference to FIG. 1 and the equipping of each of said freight conveying devices 100, 110, 120, . . . , 190 with corresponding sensor devices 104a, 104b, 104c, 104d, a network of sensor devices emerges which covers the loading and unloading area of the cargo deck 10 in a relatively close mesh. This plurality of sensor devices 104a, 104b, 104c, 140d renders it possible to determine the position of a cargo container entering, in particular the cargo container 30, relatively accurately due to a characteristic overlap pattern. Thus the present invention exploits the fact that, due to the plurality of sensor devices 104a, 104b, 104c, 140d present, it is possible to effectively determine the position of the cargo container 30. The positions in conjunction with the time result in a dataset which indicates the conveying route F.

Alternatively, the conveying route F can be indicated by an ordered overlap pattern of the sensor devices 104a, 104b, 104c, 104 of the freight conveying devices 100, 110, 120, . . . , 210 and stored. For example, the following log can specify the conveying route F illustrated in FIG. 1:

1. Overlapping of the freight conveying devices 100, 110, 120;
2. Overlapping of the freight conveying devices 140, 150, 160;
3. Overlapping of the freight conveying device 180;
4. Overlapping of the freight conveying device 190.

Assuming that the cargo loading system loads each conveying path A, B such that the freight containers 30 are parked more or less immediately next to each other and the end positions of the cargo containers 30 loaded so far are known, this short log is already sufficient for determining the end position of the corresponding freight container 30.

In one embodiment of the invention, however, the overlaps of the freight conveying devices 100, 110, 120, . . . , 210 are logged until the cargo container 30 has reached its end position (=overlap pattern no longer changes).

In one embodiment, each freight conveying device 100, 110, 120, . . . , 210 supplies only one status flag in respect of the overlap (the information of the four sensor devices 104a, 104b, 104c, 140d per freight conveying device 100, 110, 120, . . . ., 210 is combined into one status).

In another embodiment (FIG. 3), the control system 20 receives the individual signals of the relevant sensor devices 104a, 104b, 104c, 140d via the freight conveying devices 100, 110, 120, . . . , 210. In addition, it receives signals from the RFID reading devices 25, 25' which are preferably inserted on the floor side into the cargo deck 10. Optionally, the received identifier may also contain details about the dimensions of the cargo container 30 such that the position can be determined even more accurately based on the received overlap pattern.

As illustrated in FIG. 3, the control system 20 comprises a memory device 21 and a processor 22. The memory device stores, inter alia, instructions for performing the method according to the invention which are executed on the processor 22. In addition, the memory device 21 may contain one or a plurality of tables which indicate a specific end position for each cargo item moved in. These tables are updated dynamically during the loading process.

According to the invention, the control system 20 can be designed in such a way that this table is updated during transit stops of the aircraft. For example, during an appropriate transit stop, the cargo container 30 may be moved from its earlier end position to a new end position. This changed end position can again be stored in conjunction with the identifier of the cargo container 30. In addition, new cargo containers 30 may be positioned on the cargo deck and cargo containers 30 loaded at an earlier time may be unloaded. The described control system 20 detects the associated cargo conveying route F for each loading and unloading process and transshipment process and updates the relevant table based on the information gained.

In addition, the control system 20 has an optional input device 24 in the embodiment described. Thus, for example, the control system 20 may be designed to carry out some partial operations of a loading process automatically, for example the rotation of a cargo item. After this, the cargo item may be conveyed manually via the input device 24. In particular, the ground staff may select the cargo loading path A or B and have the appropriate cargo item moved into one of these cargo loading paths A or B. The control system 20 according to the invention tracks the conveying route F which the cargo item takes and therefore knows the end position of the relevant cargo item, regardless of whether the loading process has been carried out manually or automatically or partially automatically.

FIG. 5 illustrates the cargo container 30 purely by way of example. This is shown as a square shape for ease of illustration. The underside of the cargo container, the cargo base 31, has a protruding edge in which an RFID tag 34 is incorporated. According to the invention, this RFID tag 34 is located in a corner of the cargo container 30. The precision of the method according to the invention may be increased if a plurality of RFID tags 34 is provided, for example one in each corner. The RFID tag 34 is preferably arranged in such a manner that it is detectable from underneath, that is from a direction perpendicular to the cargo hold floor 31.

FIGS. 6, 7 show a cargo container 30 with four correspondingly arranged RFID tags 34.

As can be seen with reference to FIG. 6, the cargo container 30 has a frame with four corner profiles 40, 40', 40", 40"'. Each of these four corner profiles 40, 40', 40", 40"' has a transponder holding device 50 in the corner profile 40.

FIG. 7 illustrates the arrangement of the transponder holding device 50 in the corner profile 40.

The corner profile 40 is preferably open towards the bottom such that an RFID tag 34 held in the transponder holding device is readable from below. In this respect, the RFID sensor devices 25, 25' from FIGS. 1 and 2 can detect the corresponding RFID tags 34.

According to the invention, a loading plan can be created dynamically during loading of the aircraft. An appropriate method may comprise the following steps:

Detecting an identifier of the cargo container;
Receiving a plurality of signals from the sensors 104a, 104b, 104c, 140d;
Determining a conveying route (F) based on the signals;
Calculating an end position of the cargo container 30, taking into account the conveying route;
Storing of data which indicate the end position and the detected identifier of the cargo container 30.

Detection of the identifier of the cargo container 30 may take place on entering through the door opening 7 by means of the RFID sensor devices 25, 25' integrated in the cargo deck 10. The control system 20 queries these RFID sensor devices 25, 25' and stores the detected identifier. This produces a characteristic overlap pattern in the loading and unloading area which changes over time. The control system 20 detects the signals of the sensors 104a, 104b, 104c, 140d at least of the relevant freight conveying devices 100, 110, . . . , 210 at regular intervals. The overlap patterns are stored in the memory device 21 as a function of the time. After an alignment of the cargo container 30 parallel to the cargo conveying path B, the cargo container 30 enters said conveying path B. The sensors 100a, 100b, 100c, 100d of the freight conveying devices 200, 210 installed in the cargo conveying path B are also queried at regular intervals. Here too, an overlap pattern emerges which migrates towards the tail of the aircraft in the course of the journey of the cargo container 30. As soon as the cargo container 30 has reached its end position, the overlap pattern no longer changes. The control system 20 can identify this static state and takes it as an indicator that the cargo container 30 has reached its end position. At this point, the end position is stored in conjunction with the identifier detected at the beginning. The data which indicate the end position may, for example, be the specific overlap pattern of certain freight conveying devices 100, 110, ..., 210. Alternatively, the cargo deck 10 may be logically divided into various loading positions. Each position may have an identification number (a1, a2, a3, ...; b1, b2, ...) which is then stored in conjunction with the identifier of the detected cargo item.

According to the invention, it is possible for the cargo container 30 to be moved from its original end position to a different end position. For example, the cargo container 30 according to FIG. 1 may be moved from conveying path B into conveying path A during a transit stop of the aircraft. The control system 20 according to the invention monitors the conveying process as described and determines the corresponding conveying route F. The conveying route F is used according to the invention to determine the new end position of the cargo container 30 in the conveying path A. When determining the end position, information already gained, for example the positions of other cargo containers 30, may be used. As soon as the transshipment process is complete, the control system 20 again stores the identifier in conjunction with the end position. Alternatively, an already stored dataset may be updated.

In the embodiment described, the cargo deck 10 has only two cargo conveying paths A, B. It is readily possible to apply the teaching according to the invention to a cargo deck 10 which has a plurality of conveying paths, for example three or four. The method according to the invention is also useful in connection with a cargo deck 10 which provides no specified division into two cargo paths A, B. With an appropriate sensor density, it is possible to detect any configurations of the cargo deck 10 and any associated conveying routes F.

The teaching according to the invention may also be used in connection with a cargo deck 10 which offers various configurations. Theoretically, it is possible for the specific configuration to be entered manually before the beginning of the loading process. Alternatively, the control system 20 detects the states of the appropriate latches such that dynamic determination of the cargo deck configuration is guaranteed.

In the embodiment described, the aircraft has a corresponding cargo deck 10. The teaching according to the invention may be readily used for a cargo deck 10 in a storage hall, a factory or similar.

In the embodiment described, relevant sensors are arranged immediately on or close to the freight conveying devices. It is readily possible to arrange the sensors at other positions regardless of the freight conveying devices.

LIST OF REFERENCE NUMBERS 1, 2 Side wall
5 Central plane
7 Door opening
10 Cargo deck
11, 11', 11", 11''' Central latch
20 Control system
21 Storage device
22 Processor
24 Input device
25, 25' RFID sensor device
30 Cargo container
31 Cargo base
34 RFID tag
40, 40', 40", 40''' Corner profile
50 Transponder holding device
100, 110, 120, ..., 210 Freight conveying devices
101 Roller drive units
102a, 102b Drive rollers
103 Rotating plate
104a, 104b, 104c, 104d Sensor devices
105 Frame
106 Rotational axis
X, Y, Z X-direction, Y-direction and Z-direction
A Cargo loading path A
B Cargo loading path B
F Conveying route

The invention claimed is:

1. A cargo loading system for loading and unloading a cargo deck, in particular an aircraft deck, comprising:
   at least one cargo reading device mounted in the entrance area of the aircraft, in particular an RFID reading device, for detecting at least one identifier of a cargo item;
   a plurality of freight conveying devices each having at least one roller for conveying the cargo item along a conveying route into an end position,
   a control system which receives signals from sensors in order to detect a movement of the cargo item along the conveying route and which is communicatively connected to the cargo reading device,
   wherein the control system is designed to detect the end position of the cargo item on the cargo deck based on the signals and to store data which indicate said end position in conjunction with the detected identifier of the cargo item.

2. The cargo loading system according to claim 1, wherein the control system is communicatively connected, in particular via a communication bus, to the plurality of freight conveying devices in order to detect activation of at least some of the freight conveying devices and/or to bring this about.

3. The cargo loading system according to claim 1, wherein the control system is designed to detect a dimension of a base area of the cargo item and to process it for determining the end position and/or conveying route of the cargo item.

4. The cargo loading system according to claim 1, wherein the sensors comprise light sensors which are arranged and formed on the cargo deck in such a manner that they detect at least the presence of a cargo item.

5. The cargo loading system according to claim 1, wherein at least one subset of the sensors is arranged in a grid spanning the width of the cargo deck, preferably in the loading and unloading area of said cargo deck.

6. The cargo loading system according to claim 1, wherein at least one subset of the freight conveying devices comprises at least one sensor in each case, preferably at least two or four sensors, for detecting the cargo item, wherein the sensors are arranged on the relevant freight conveying device, preferably surrounding at least one roller.

7. The cargo loading system according to claim 1, wherein at least one subset of the freight conveying devices is arranged in a grid, preferably in the loading and unloading area of the cargo deck.

8. The cargo loading system according to claim 1, wherein the control system is designed to store at least some of the signals as a signal set, in particular in conjunction with a sequence and/or a time indication.

9. The cargo loading system according to claim 1, wherein the control system is designed to develop a control strategy, taking into account an entered loading position, and to control a plurality of the freight conveying devices according to said control strategy.

10. The cargo loading system according to claim 1, wherein the control system is designed
- to monitor the conveying route (F) of a reparking process of a cargo item;
- to determine a new end position of the cargo item, taking into account the conveying route; and
- to store the new end position in conjunction with the detected identifier of the cargo deck.

11. A method for creating and/or updating a loading plan, in particular by means of a cargo loading system according to claim 1, comprising the steps:
- Detecting an identifier of a cargo item in at least one entrance area of a cargo deck;
- Receiving a plurality of signals from sensors which are distributed over at least one section of a cargo deck;
- Determining a conveying route based on the signals;
- Calculating an end position of the cargo item, taking into account the conveying route;
- Storing of data which indicate the end position, in conjunction with the detected identifier.

12. The method according to claim 11, wherein detection of the identifier comprises reading of a memory mounted on the cargo item, in particular of an RFID chip, using a reading device.

13. The method according to claim 11, wherein at least some of the signals from the sensors are stored in a time sequence and/or in conjunction with time indications.

14. The method according to claim 11, wherein at least some of the signals indicate an activation of an actuator, in particular of a freight conveying device, at a specific time.

15. A computer-readable medium having instructions for performing the method according to claim 11 wherein the instructions are executed on a central processing unit.

* * * * *